United States Patent
Chang et al.

(10) Patent No.: US 12,149,998 B2
(45) Date of Patent: Nov. 19, 2024

(54) HANDOVER METHOD PERFORMED BY USER EQUIPMENT, AND USER EQUIPMENT

(71) Applicant: SHARP KABUSHIKI KAISHA, Sakai (JP)

(72) Inventors: Ningjuan Chang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 465 days.

(21) Appl. No.: 17/424,142

(22) PCT Filed: Jan. 20, 2020

(86) PCT No.: PCT/CN2020/073181
§ 371 (c)(1),
(2) Date: Jul. 19, 2021

(87) PCT Pub. No.: WO2020/151653
PCT Pub. Date: Jul. 30, 2020

(65) Prior Publication Data
US 2022/0104089 A1 Mar. 31, 2022

(30) Foreign Application Priority Data
Jan. 22, 2019 (CN) .......................... 201910061161.4

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0079* (2018.08); *H04W 76/20* (2018.02); *H04W 76/30* (2018.02)

(58) Field of Classification Search
CPC . H04W 36/08; H04W 36/0079; H04W 76/20; H04W 76/30; H04W 36/18; H04W 76/19; H04W 36/305; H04W 76/18
(Continued)

(56) References Cited

U.S. PATENT DOCUMENTS

| 2014/0056243 A1* | 2/2014 | Pelletier | H04W 16/32 |
| | | | 370/329 |
| 2016/0081081 A1* | 3/2016 | Xu | H04W 72/27 |
| | | | 370/329 |

(Continued)

FOREIGN PATENT DOCUMENTS

| CA | 3050124 A1 * | 9/2018 | ............ H04W 24/08 |
| CN | 104955064 A | 9/2015 | |

(Continued)

OTHER PUBLICATIONS

Ericsson. "Oms Interruption Support during Handover Procedure in NR"; 3GPP TSG-RAN WG2 NR AH#2 Tdoc R2-1706625, Jun. 29, 2017 (Jun. 29, 2017) (Year: 2017).*

(Continued)

*Primary Examiner* — Khaled M Kassim
*Assistant Examiner* — Oladiran Gideon Olaleye
(74) *Attorney, Agent, or Firm* — ScienBiziP, P.C.

(57) ABSTRACT

The present disclosure provides a handover method performed by user equipment and user equipment. The handover method performed by user equipment (UE) comprises: receiving, by the UE, a handover command, the handover command instructing the UE to perform a handover from a source base station to a target base station with an enhanced handover mechanism; and applying, by the UE, to the target base station a Radio Resource Control (RRC) configuration comprised in the handover command, and maintaining an RRC configuration for the source base (Continued)

station at the same time, so as to perform the handover. In this way, the UE can communicate with the source base station and the target base station during the handover procedure, thereby implementing an enhanced handover mechanism, and reducing a handover interruption delay and a packet loss rate.

10 Claims, 4 Drawing Sheets

(51) Int. Cl.
  *H04W 76/20* (2018.01)
  *H04W 76/30* (2018.01)
(58) Field of Classification Search
  USPC .......................................................... 370/331
  See application file for complete search history.

(56) References Cited

U.S. PATENT DOCUMENTS

| | | | | |
|---|---|---|---|---|
| 2016/0192261 | A1* | 6/2016 | Wang | H04W 36/30 370/331 |
| 2017/0111832 | A1 | 4/2017 | Wen et al. | |
| 2018/0227819 | A1 | 8/2018 | Lee et al. | |

FOREIGN PATENT DOCUMENTS

| | | | | |
|---|---|---|---|---|
| CN | 107005898 | A | 8/2017 | |
| CN | 108702673 | A | 10/2018 | |
| KR | 20180081446 | A * | 12/2017 | |
| TW | 201422037 | A * | 6/2014 | ........... H04L 5/0032 |
| WO | 2017/138977 | A1 | 8/2017 | |
| WO | WO-2018171546 | A1 * | 9/2018 | ........... H04L 1/1614 |

OTHER PUBLICATIONS

3GPP. "Radio Resource Control (RRC)"; 3GPP TS 36.331 VJ 5.3.0, Sep. 30, 2018 (Sep. 30, 2018). (Year: 2018).*
Qualcomm Incorporated, "LTE Mobility Enhancements," 3GPP TSG-RAN WG2 Meeting #104, R2-1817813, Spokane, USA, Nov. 12-16, 2018. (Year: 2018).*
3GPP TS 38.331 V15.4.0 (Dec. 2018) 3rd Generation Partnership Project; Technical Specification Group Radio Access Network; NR; Radio Resource Control (RRC) protocol specification (Release 15).
3GPP TS 36.331 V15.3.0 (Sep. 2018) 3rd Generation Partnership Project; Technical Specification Group Radio Access Network; Evolved Universal Terrestrial Radio Access (E-UTRA); Radio Resource Control (RRC); Protocol specification (Release 15).
China Telecom, "Revised WID: Even further mobility enhancement in E-Utran", RP-181544 3GPP TSG RAN meeting #81, Gold Coast, Australia, Sep. 10-13, 2018.
Intel Corporation, "New WID: NR mobility enhancements", RP-181433 3GPP TSG RAN Meeting #80, La Jolla, USA, May 21-May 25, 2018.
Huawei, HiSilicon, "DC based NR scheme for 0ms interruption handover", R2-1708877 3GPP TSG-RAN WG2 #99, Berlin, Germany, Aug. 21-25, 2017.
Ericsson, "0 ms interruption support during handover procedure in NR", R2-1706625 3GPP TSG-RAN WG2 NR AH#2, Qingdao, China, Jun. 27-29, 2017.
Nokia et al., "Non-split bearer solution for reducing the service interruption time in HO", R2-1817691, 3GPP TSG-RAN WG2 Meeting #104, Spokane, US, Nov. 12-16, 2018.
Qualcomm Incorporated, "LTE Mobility Enhancements", R2-1817813, 3GPP TSG-RAN WG2 Meeting #104, Spkane, USA, Nov. 12-16, 2018.

* cited by examiner (a)

(b)

(c)

HANDOVER METHOD PERFORMED BY USER EQUIPMENT, AND USER EQUIPMENT

TECHNICAL FIELD

The present disclosure relates to the technical field of wireless communications. More specifically, the present disclosure relates to a handover method performed by user equipment and user equipment.

BACKGROUND

A new research project on 5G technical standards (see non-patent literature: RP-181433: New WID on NR (New Radio) mobility enhancements) and a new research project on Long Term Evolution (LTE) system Release 16 (see non-patent literature: RP-181544) were approved at the 3rd Generation Partnership Project (3GPP) RAN #80 plenary meeting in June 2018. One of the research objectives of the two research projects is to meet one of the mobility requirements in NR: seamless handover, namely, to achieve handover interruption time of zero millisecond in a cell handover procedure. Among solutions under investigation to reduce handover interruption time, one solution is an enhanced Make Before Break (MBB) mechanism. In the enhanced MBB mechanism, after receiving a handover command, UE does not cut off a link (data transmission) to a source base station in a handover process to access a target base station, but rather, the UE can maintain links to the target base station and the source base station at the same time, thereby avoiding a delay caused by service interruption caused by disconnection to the source base station before accessing the target base station.

The present disclosure provides a solution to the issue of how to implement an enhanced MBB mechanism in an LTE system or an NR system.

SUMMARY

An objective of embodiments of the present disclosure is to provide a solution to the issue of implementing an enhanced MBB technology in an LTE/NR system. More specifically, the present disclosure provides a solution to how to perform an enhanced MBB handover upon reception of a handover command in an LTE/NR system, and further provides a solution to issues such as how to release a source base station after the handover succeeds and how to recover a connection to a network after the handover fails. The embodiments of the present disclosure provide a handover method performed by user equipment and corresponding user equipment.

According to a first aspect of the present disclosure, a handover method performed by user equipment (UE) is provided, comprising: receiving, by the UE, a handover command instructing the UE to perform a handover from a source base station to a target base station with an enhanced handover mechanism; and applying, by the UE, to the target base station a Radio Resource Control (RRC) configuration comprised in the handover command, and maintaining an RRC configuration for the source base station at the same time, so as to perform the handover.

In the foregoing handover method, it is possible that the UE applies all RRC configurations comprised in the handover command to the target base station to perform the handover.

In the foregoing handover method, it is possible that the UE applies to the target base station an RRC configuration corresponding to a part of information elements comprised in the handover command to perform the handover, and the UE applies, after the handover is successfully complete, to the target base station an RRC configuration corresponding to other information elements comprised in the handover command.

In the foregoing handover method, it is possible that the UE applying to the target base station an RRC configuration corresponding to a part of information elements comprised in the handover command comprises at least one of the following operations: establishing a Medium Access Control (MAC) entity for the target base station; establishing a physical layer entity for the target base station; configuring, according to a radio resource configuration common information element, a corresponding lower layer of the target base station; configuring, according to a mobility control information element, a corresponding lower layer of the target base station; performing a radio resource configuration procedure for the target base station according to a radio resource configuration dedicated information element; deriving key(s) for communication with the target base station; performing a measurement configuration procedure according to a measurement configuration; and generating and transmitting an RRC connection reconfiguration complete message, and the UE applying, after the handover is successfully complete, to the target base station an RRC configuration corresponding to other information elements comprised in the handover command comprises: in the case where the handover command comprises a secondary cell addition/modification list information element, performing addition or modification of a secondary cell of the target base station; in the case where the handover command comprises an other configuration information element, namely, an otherconfig information element, performing a configuration procedure corresponding to the otherconfig information element; and applying an RRC configuration corresponding to information elements other than the secondary cell addition/modification list information element and the otherconfig information element in the other information elements.

In the foregoing handover method, it is possible that the UE applying to the target base station an RRC configuration corresponding to a part of information elements comprised in the handover command comprises at least one of the following operations: establishing a Medium Access Control (MAC) entity for the target base station; establishing a physical layer entity for the target base station; configuring, according to a radio resource configuration common information element, a corresponding lower layer of the target base station; configuring, according to a mobility control information element, a corresponding lower layer of the target base station; performing a radio resource configuration procedure for the target base station according to a radio resource configuration dedicated information element; deriving key(s) for communication with the target base station; generating and transmitting an RRC connection reconfiguration complete message; and applying an RRC configuration corresponding to information elements in the information elements comprised in the handover command other than the information elements corresponding to the foregoing operations, a secondary cell addition/modification list information element, and an other configuration information element, namely, an otherconfig information element, and the UE applying, after the handover is successfully complete, to the target base station an RRC configuration corresponding to other information elements comprised in the handover command comprises: in the case where the handover command comprises the secondary cell addition/modification list information element, performing addition or modification of a secondary cell of the target base station; in the case where the handover command comprises the otherconfig information element, performing a configuration procedure corresponding to the otherconfig information element.

In the foregoing handover method, it is possible that in the procedure of performing the radio resource configuration procedure for the target base station according to the radio resource configuration dedicated information element, in the case where the radio resource configuration dedicated information element comprises a Signaling Radio Bearer (SRB) addition/modification list, at least one of the following operations is performed on each SRB identity in the list: establishing a Packet Data Convergence Protocol (PDCP) entity according to a PDCP configuration; establishing a Radio Link Control (RLC) entity according to an RLC configuration; and establishing a dedicated control channel logical channel according to a logical channel configuration.

In the foregoing handover method, it is possible that in the procedure of performing the radio resource configuration procedure for the target base station according to the radio resource configuration dedicated information element, in the case where the radio resource configuration dedicated information element comprises a Data Radio Bearer (DRB) addition/modification list, at least one of the following operations is performed on each DRB identity in the list: establishing a Packet Data Convergence Protocol (PDCP) entity or reconfiguring the PDCP entity according to a PDCP configuration; establishing an Radio Link Control (RLC) entity according to an RLC configuration; establishing a dedicated control channel logical channel according to a logical channel configuration; associating an established DRB with a configured DRB having the same DRB identity or a configured DRB having the same Evolved Packet System (EPS) bearer identity; and establishing a packet processing entity.

In the foregoing handover method, it is possible that after the handover is successfully complete, the UE performs at least one of the following operations to release a connection to the source base station: reestablishing an Radio Link Control (RLC) entity corresponding to a DRB; releasing an RLC entity corresponding to a DRB; transmitting, for a DRB and by an RRC layer, instruction information to a Packet Data Convergence Protocol (PDCP) corresponding to the DRB, the instruction information being used to instruct the PDCP layer to generate and transmit a PDCP status report to the target base station; reestablishing a PDCP entity corresponding to a DRB; releasing a PDCP entity corresponding to a DRB; discarding a security context associated with the source base station; discarding or resetting a header compression protocol context corresponding to a DRB associated with the source base station; stopping all timers associated with the source base station; releasing all radio resources and/or radio configurations associated with the source base station; discarding a Service Data Application Protocol (SDAP) configuration associated with a DRB; stopping a reordering function of the PDCP layer; and releasing a packet processing entity corresponding to a DRB.

In the foregoing handover method, it is possible that in the case where the UE determines that the handover fails, it is determined whether link quality between the UE and the source base station is normal; and if the link quality between the UE and the source base station is normal, the UE transmits an RRC reestablishment request message or a handover failure indication to the source base station.

According to the present disclosure, user equipment is provided, comprising: a processor; and a memory storing instructions, wherein the instructions, when run by the processor, perform the above handover method.

Effect of Invention

The handover method performed by user equipment (UE) and UE provided according to the present disclosure provide a solution to how to perform an enhanced MBB handover by the UE after receiving a handover command, so that the UE can communicate with a source base station and a target base station during a handover procedure, thereby implementing an enhanced handover mechanism and reducing a handover interruption delay and a packet loss rate. Furthermore, the present disclosure further provides a solution for properly completing release of a connection to the source base station after the handover is complete and rapidly recovering the connection to the network side after the handover fails, so as to further effectively implement the enhanced handover mechanism, and further reduce the handover interruption delay and the packet loss rate.

BRIEF DESCRIPTION OF DRAWINGS

In order to make the present disclosure and its advantages be more completely understood, description will be made below with reference to the accompanying drawings, in which.

In the drawings, identical or similar structures are marked by identical or similar reference numerals.

DETAILED DESCRIPTION

Figure 1:
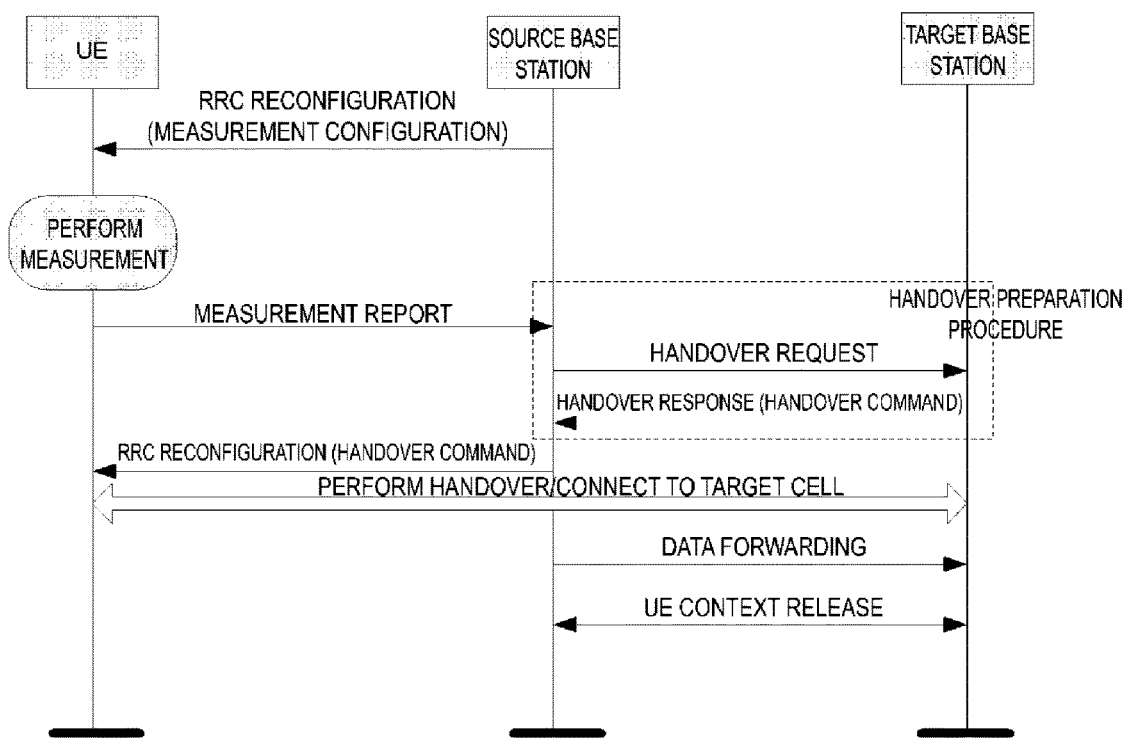
FIG. 1 is a schematic diagram showing a general handover procedure in an LTE/NR system.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" may have an inclusive meaning and means and/or.

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the figures.

A plurality of embodiments according to the present disclosure are specifically described below by using a Long Term Evolution (LTE)/NR mobile communication system and subsequent evolved versions thereof as an exemplary application environment. However, it is to be noted that the present disclosure is not limited to the following embodiments, but may be applied to other wireless communications systems. In the present disclosure, the term "base station" refers to a mobile communication data and control exchange center with a larger transmit power and a wider coverage area, and has functions of resource allocation scheduling, data receiving and transmitting, and the like. The term "user equipment" refers to a user mobile terminal, such as a terminal device that can perform wireless communication with a base station or a micro base station, including a mobile phone, a notebook, or the like. If not specifically indicated, the concepts of a cell and a base station are interchangeable in the present disclosure. An LTE system also refer to an 5G and a subsequent LTE system (for example, an eLTE system, or an LTE system that can be connected to an 5G core network). In addition, the LTE may be replaced with an Evolved Universal Terrestrial Radio Access Network (E-UTRAN) or an Evolved Universal Terrestrial Radio Access (E-UTRA). In the present disclosure, a source cell may also be referred to as a source base station, or may be a source beam (beam), a source Transmission Point (TRP), a source cell group, a source master cell group, and a target cell may also be referred to as a target base station, or may be a target beam, a target transmission point, a target cell group, or a target master cell group. The source cell refers to a base station that serves the UE before a handover procedure is performed, or a cell that serves the UE or that the UE camps on before a cell reselection occurs, and the target cell refers to a base station that serves the UE after the handover procedure is performed, or a cell that is indicated in a handover command, or a cell that serves the UE or that the UE camps on after the cell reselection occurs.

User mobility in a connected state is implemented mainly by means of a handover procedure. In the present disclosure, the handover generally refers to a handover, a cell change, an intra-cell handover for security update, etc., that are controlled by a network layer or the UE in an RRC connected state. The handover command is used to trigger the UE to perform network side-controlled mobility change, namely a handover, and usually refers to an RRC (connection) reconfiguration message including a synchronization reconfiguration information element (Reconfigurationwithsync) or a mobility control information information element (MobilityControlInformation). The synchronization reconfiguration information element or the mobility control information information element includes basic configuration information that the UE uses to access the target base station, and is used to configure mobility information for the UE in network-side-controlled mobility. If not specifically indicated, the two terms are interchangeable in the present disclosure.

Contents contained in the handover command are introduced first. In an LTE system, an RRC connection reconfiguration message for a handover command carries RRC configurations from a target base station, including but not limited to the following RRC configurations (see Section 6.2.2 of 3GPP Technical Standard Protocol 36.331 for details):

A measurement configuration (measconfig information element): used to configure intra-frequency, inter-frequency, and inter-radio access technology measurements performed by UE, for example, a measurement object configuration, a measurement report configuration, a measurement gap configuration, etc.

Mobility control information (mobilitycontrolInfo information element): as previously described, basic information to be acquired by the UE for configuring network-side-controlled mobility, including a target cell identity, a target carrier frequency, a carrier band block corresponding to the target cell, a timer T304 configuration, a Cell-Radio Network Temparory Identifier (C-RNTI) used by the UE in the target cell, radio resource configuration common information (RadioresourceconfigCommon information element), a random access dedicated configuration (rach-configDedicated), a RACH-less access indication, MBB enabling information, V2X information, etc.

Non-access stratum dedicated information (dedicatedInfoNASList information element).

Radio resource control dedicated information (radioresourceConfigDedicated information element), including a Signaling Radio Bearer (SRB) addition/modification list, an SRB release list, a Data Radio Bearer (DRB) addition/modification list, a DRB release list, a MAC configuration, a physical layer dedicated configuration, a semi-persistent scheduling configuration, a radio link failure related timer, and a constant configuration.

A handover security configuration (securityconfigHO Information Element)

Secondary cell configuration information (a secondary cell addition/discarding list and/or a secondary cell release list)

Other configurations (otherconfig information element), used to configure a proximity report configuration (reportproximityconfig information element)), an In-Device Coexistence (IDC) configuration, a power preference indication configuration (powerprefIndicationconfig information element), a location obtaining configuration (obtainlocationconfig Information Element), etc.

An LTE-WLAN Aggregation (LWA) configuration.

An LTE-WLAN Radio Level Integration with IPsec Tunnel (LWIP) configuration.

A Radio Controlled LTE-WLAN Integration (RCLWI) configuration.

A sidelink communication configuration (sidelink related configuration).

In an NR system, an RRC reconfiguration message for a handover command carries RRC configurations from a target base station, including but not limited to the following RRC configurations (see Section 6.2.2 of 3GPP Technical Standard Protocol 38.331 for details):

A measurement configuration (measconfig information element): used to configure intra-frequency, inter-frequency, and inter-radio access technology measurements performed by UE, for example, a measurement object configuration, a measurement report configuration, a measurement gap configuration, etc.

A cell group configuration (cellGroupConfig information element), used to configure a master cell group or a secondary cell group, including an RLC bearer configuration (rlc-bearerToAddModList information element and rlc-bearerToreleaselist information element), a MAC configuration (MAC-cellgroupconfig information element), a physical layer configuration, a secondary cell addition/modification/release configuration, a special cell (SpCell) configuration corresponding to a DRB/SRB, etc. The spcell configuration includes a cell index number, handover information (reconfigurationWithSync information element), a radio link failure related timer and constant configuration, a Radio Link Monitoring (RLM) configuration, a special cell dedicated configuration, etc. The reconfigurationwithsync information element is similar to the mobility control information in the LTE system and includes handover related information to implement mobility, and the information element includes serving cell configuration common information, a C-RNTI of the UE in the target cell, a handover related timer T304 configuration, a random access dedicated configuration for a random access procedure to the target cell.

Non-access stratum dedicated information (dedicatedInfoNASList information element).

A radio bearer configuration (radiobearerConfig information element), used to configure a Service Data Application Protocol (SDAP) and a PDCP of a radio bearer DRB and/or an SRB.

A master key update configuration (masterKeyupdate information element).

Other configurations (otherconfig information element), used to configure a proximity report configuration (reportproximityconfig information element)), an In-Device Coexistence (IDC) configuration, a power preference indication configuration (powerprefIndicationconfig information element), a location obtaining configuration (obtainlocationconfig Information Element), etc.

A general handover procedure in an LTE/NR system is briefly described below. Referring to FIG. 1, the process is briefly described as follows:

Phase 1: A base station delivers a measurement configuration to user equipment (UE); the UE measures, based on the measurement configuration, a radio link corresponding to a serving cell, and the UE transmits a measurement report to the base station when a configured report condition is met. The base station determines, according to the received measurement report and other factors such as the payload of the base station, whether to hand over the UE.

Phase 2: If a handover is determined, then the source base station triggers a handover preparation process to transmit a handover request message to a target base station; the target base station determines, according to factors such as a context of the UE in the handover request message and available resources of the target base station, whether to accept the UE, and if so, then feeds back a handover acknowledgment message to the source base station, where the handover acknowledgment message includes a handover command for transmitting to the UE to instruct the UE to perform a handover.

Phase 3: The source base station delivers the handover command to the UE, and starts to forward data to the target base station. The UE receiving the handover command immediately executes the handover command, applies a Radio Resource Control (RRC) configuration in the handover command, disconnects from the source base station, and starts to access the target base station, for example, accesses the target base station through a random access procedure.

An MBB mechanism is introduced into a Release 14 LTE system in this phase. That is, the UE can still maintain communication with the source base station after receiving the handover command and before starting to access the target base station (for example, before transmitting an access preamble to the target base station to initiate a random access procedure), and disconnect from the source base station only after starting to access the target base station (for example, after transmitting the access preamble to the target base station to initiate the random access procedure). The MBB mechanism may reduce handover interruption time to some extent.

Phase 4: After confirming a successful access by the UE, the target base station transmits a handover complete message to the source base station. Based on the handover complete message, the source base station discards the UE context stored thereon.

It can be seen from the above that the handover procedure in the LTE system causes interruption of data transmission. Even if the MBB mechanism is employed during the handover procedure, after attempting to access the target base station and before starting data communication with the target base station when the access succeeds, the UE is still in a process involving no data communication with the network side, and transmission of user data cannot be performed during this period of time. In LTE systems of subsequent releases, optimization of a handover procedure such as a handover without a random access procedure aims to reduce handover delays and overheads, and can also bring decreases in data interruption time during the handover procedure, but still fails to meet requirements of "zero milliseconds" or "near zero milliseconds" data interruption time.

Figure 2:
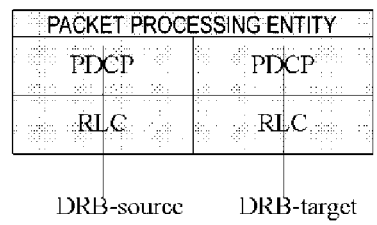
FIG. 2 is a schematic diagram showing an implementation method of UE communicating with two base stations simultaneously during a handover procedure.
Figure 2:
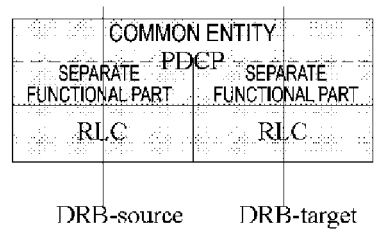
Figure 2:
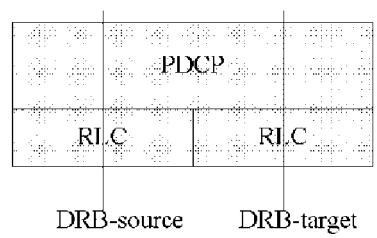

In technical requirements of 5G NR and Release 16 LTE systems, it is required to meet the data interruption time of "zero milliseconds" as much as possible in a mobile handover procedure so as to meet the mobility requirements of seamless handover. In view of the cause of the above data interruption during the handover procedure, a feasible enhanced handover method is that the UE maintains communication with the source base station and also accesses the target base station during the handover procedure. That is, the UE maintains communication with both the source base station and the target base station at the same time during the handover procedure. Within a period of time, the UE can perform data transmission with the source base station and can also perform data transmission with the target base station, and after a successful handover to the target base station, a connection to the source base station is released, so that data interruption time of "zero milliseconds" is achieved in this manner. This requires that the UE has two sets of transceiving devices, and has separate Medium Access Control (MAC) and physical layer processing for both the source base station and the target base station. For a Data Radio Bearer (DRB), in order to communicate with the two base stations during the handover procedure, the UE needs to have a data radio bearer with the source base station (referred to as DRB-source) and a radio bearer with the target base station (referred to as DRB-target). From the perspective of a protocol stack, there may be a plurality of implementation methods, which, using a protocol stack at the UE side as an example, include, for example:

Method 1: The DRB-source and the DRB-target respectively include separate data convergence layers (Packet Data Convergence Protocols, PDCPs) and Radio Link Control layers (RLCs), as shown in FIG. 2(a). The UE needs to perform a series of processing (for example, sequencing, duplicate packet discarding, etc.) on data packets received on the DRB-source and the DRB-target via a common entity over the PDCP layer (referred to as a packet processing entity in the present disclosure) and then deliver the packets to an upper layer.

Method 2: The DRB-source and the DRB-target respectively include separate RLC layers, but share the same PDCP. Notably, however, inside the PDCP, some functional entities are separate for the DRB-source and the DRB-target, whereas some functional entities are common for the DRB-source and the DRB-target. For example, security processing is separately performed on the DRB-source and the DRB-target in the PDCP, and different security keys may be used, but they both share a reordering function, and data processed by the common functional entity is delivered to the upper layer. In different implementations, configuration of separate functional entities and common functional entities is different. For example, a robust header compression (RObust Header Compression, ROHC) function for packet compression (decompression) may be implemented as separate functional entities or as a common functional entity for the DRB-source and the DRB-target, as shown in FIG. 2(b).

Method 3: The DRB-source and the DRB-target respectively include separate RLC layers, but share the same PDCP, as shown in FIG. 2(c). Unlike method 2, all functions of the PDCP are common, such as a security function and an ROHC function. For an uplink data packet, after processing the PDCP received from an upper layer, the PDCP delivers the data packet to an RLC of the DRB-source and an RLC of the DRB-target corresponding to a lower layer, respectively. For a downlink data packet, data from the source base station is delivered to the PDCP via the RLC of the DRB-source, data from the target base station is delivered to the PDCP via the RLC of the DRB-target, and data is processed by this common PDCP and then delivered to the upper layer.

The manner of protocol stack processing of DRBs in method 3 is usually referred to as split bearers or Dual Connectivity (DC)-based bearers in Release 15 and prior LTE. However, in the current technical discussion, the DRBs in method 1 and method 2 are generally referred to as non-split bearers or non-dual connectivity-based bearers or enhanced MBB bearers, but sometimes are also referred to as dual connectivity-based bearers in method 2. A corresponding enhanced handover mechanism using such a method may also be referred to as a DC-based handover, a non-split bearer handover, a split bearer handover, etc. The handover enhancement method described in the present disclosure in which the UE simultaneously maintains communication with the source base station and the target base station during the handover procedure is not limited to the foregoing methods 1 to 3. Similarly, the present disclosure also does not limit the name and specific manner of the foregoing methods 1 to 3.

In an enhanced handover mechanism (that is, the UE maintains communication with the source base station and also maintains communication with the target base station during a handover procedure), before receiving a handover command, the UE applies an RRC configuration from the source base station. After receiving a handover command including an RRC configuration of the target base station, how the UE maintains connections to the source base station and the target base station at the same time, how to release the source base station after a handover succeeds, and how to recover the connection to the network side after the handover fails become issues to be resolved by the present disclosure. The following implementation method provided in the present disclosure enables the UE to communicate with the source base station and the target base station during the handover procedure, and properly complete release of the source base station after the handover is complete, and quickly recovers the connection to the network side after the handover fails, thereby implementing an enhanced handover mechanism and reducing a handover interruption delay and a packet loss rate.

Figure 3:
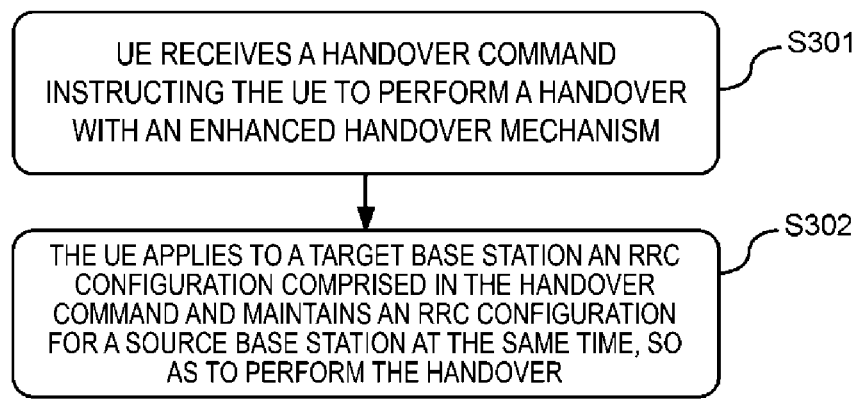
FIG. 3 is a flowchart showing a handover method performed by user equipment according to an embodiment of the present disclosure.

FIG. 3 is a flowchart showing a handover method performed by user equipment (UE) according to an embodiment of the present disclosure, in which the handover method performed by the UE includes step S301 and step S302. In step S301, the UE receives a handover command, the handover command instructing the UE to perform a handover from a source base station to a target base station with an enhanced handover mechanism. In step S302, the UE applies to the target base station a Radio Resource Control (RRC) configuration included in the handover command, and maintains an RRC configuration for the source base station at the same time, so as to perform the handover. According to the handover method, the UE can communicate with the source base station and the target base station during the handover procedure, thereby implementing an enhanced handover mechanism and reducing a handover interruption delay and a packet loss rate.

Several embodiments of the present disclosure are described in detail below.

Embodiment 1

This embodiment provides a method for UE to execute an RRC configuration in a handover command in an enhanced handover mechanism.

Step 1: The UE receives a handover command (RRC (connection) reconfiguration message). The handover command instructs the UE to perform an enhanced handover mechanism, for example, the handover command includes an enhanced handover mechanism indication. Alternatively, the enhanced handover mechanism indication may also be separately configured for each DRB, that is, each DRB may correspond to one enhanced handover mechanism indication. In this case, a DRB-related operation in the following step 2 is performed on only a DRB configured with an enhanced handover mechanism indication.

Step 2: The UE applies to a target base station an RRC configuration in the handover command, and the UE maintains an RRC configuration for a source base station at the same time. By this step, the UE applies two sets of configurations to all RRC configurations, one set corresponding to the source base station for communication between the UE and the source base station; and one set corresponding to the target base station for communication between the UE and the target base station. The RRC configurations include an RRC configuration in the RRC (connection) reconfiguration message as described above.

The applying to the target base station the RRC configuration in the handover command includes a combination of one or a plurality of the following operations:

Establish a MAC entity for the target base station. Preferably, a system-defined default configuration is applied to the MAC entity. Alternatively, the MAC entity is configured according to a MAC main configuration information element (mac-MainConfig) in the received RRC connection reconfiguration message.

Establish a physical layer entity for the target base station. Preferably, a system-defined default configuration is applied to the physical layer entity. Alternatively, the physical layer entity is configured according to a physical layer configuration dedicated information element (physicalConfigDeadicated) in the received RRC connection reconfiguration message.

Configure, according to a received radio resource configuration common information element (radioresourceconfigCommon), a corresponding lower layer of the target base station. Preferably, the lower layer includes a physical layer and a MAC layer.

Configure, according to a received mobility control information element (mobilityControlInfo information element), a corresponding lower layer of the target base station.

Perform, according to a received radio resource configuration dedicated information element (radioresourceconfigDedicated), a radio resource configuration procedure for the target base station. Alternatively, the UE may also perform this operation after a random access to the target base station is successfully complete.

The performing the radio resource configuration procedure includes a combination of one or a plurality of the following:

If the radio resource configuration dedicated information element includes an SRB addition/modification list, then perform on each SRB identity included in the SRB addition/modification list a combination of one or a plurality of the following:

Establish a PDCP entity according to a received PDCP configuration.

Establish an RLC entity according to a received RLC configuration.

Establish a Dedicated Control Channel (DCCH) logical channel according to a received logical channel configuration.

If the radio resource configuration dedicated information element includes a DRB addition/modification list, then perform on each DRB identity included in the DRB addition/modification list a combination of one or a plurality of the following:

Preferably, establish a PDCP entity according to a received PDCP configuration. Alternatively, reconfigure the PDCP entity according to the received PDCP configuration. The reconfiguring the PDCP entity includes establishing in the PDCP entity a corresponding functional entity such as a security function or a header compression processing function, etc., for the target base station (or described as activating/enabling a function corresponding to the target base station in the PDCP entity).

Establish an RLC entity according to a received RLC configuration.

Establish a Dedicated Control Channel (DCCH) logical channel according to a received logical channel configuration.

If the DRB identity is a part of a current UE configuration or the UE has been configured with a DRB having the same Evolved Packet Service (EPS) bearer identity, then the UE associates the established DRB (i.e., DRB-target) with a DRB (DRB-target) having the same DRB identity or a DRB (DRB-target) having the same EPS bearer identity.

Establish a packet processing entity. Preferably, a packet processing entity is established according to a received packet processing entity configuration (for example, a reordering timer configuration).

Derive key(s) for communication with the target base station, and configure a lower layer (PDCP) to apply the derived key(s) ($K_{RRCint}$, $K_{RRCenc}$, and $K_{UPenc}$) to all subsequent messages/data communicated with the target base station (received from and transmitted to the target base station).

If the received RRC connection reconfiguration message includes a secondary cell addition/modification list information element, then perform addition or modification of a secondary cell of the target base station.

The addition or modification of the secondary cell includes the following operations:

Perform one or both of the following operations for each secondary cell index value included in the secondary cell addition/modification list:

Add the secondary cell. Specifically, the secondary cell corresponding to the secondary cell index value is added, and the secondary cell is configured according to a received radio resource configuration for the secondary cell.

If a cell state of the secondary cell (sCellState information element) is configured and indicated as activated, then configure a corresponding lower layer (PDCP/RLC/MAC) of the target base station to set the secondary cell to an activated state; otherwise, if the cell state of the secondary cell is configured and indicated as dormant, configure the corresponding lower layer (PDCP/RLC/MAC) of the target base station to set the secondary cell to a dormant state; otherwise, configure the corresponding lower layer (PDCP/RLC/MAC) of the target base station to set the secondary cell to a deactivated state.

In the above operation, it is allowed that a secondary cell corresponding to the source base station and a secondary cell corresponding to the target base station have the same secondary cell index (or serving cell index), or have completely different secondary cell indexes (in this case, the secondary cell index of the source base station and the secondary cell index of the target base station share a secondary cell index value pool). In the former case, the UE respectively maintains separate secondary cells (lists) for the source base station and the target base station; in the latter case, the UE maintains the same secondary cell (list) for the source base station and the target base station.

If the received RRC connection reconfiguration message includes an other configuration information element (otherconfig), then perform other configuration procedures for the target base station.

Apply the remaining RRC configuration other than the RRC configuration in the received message that has been applied, such as an LTE-WLAN aggregation configuration.

Generate an RRC connection reconfiguration complete message, and deliver the RRC connection reconfiguration complete message to the lower layer for transmission.

Embodiment 2

This embodiment provides another method for UE to execute an RRC configuration in a handover command. Unlike the method used in Embodiment 1 in which the UE applies to the target base station all the RRC configurations in the handover command immediately after receiving the handover command, and simultaneously maintains two sets of RRC configurations for both the target base station and the source base station during the handover procedure, in Embodiment 2, after receiving a handover command, the UE immediately applies, according to a part of information elements included in the handover command, a corresponding RRC configuration to the target base station, and after successfully completing a random access procedure at a MAC layer, the UE applies, according to other part of information elements included in the handover command, a corresponding RRC configuration to the target base station.

Step 1: The UE receives a handover command (RRC (connection) reconfiguration message). The handover command instructs the UE to perform an enhanced handover mechanism, for example, the handover command includes an enhanced handover mechanism indication. Alternatively, the enhanced handover mechanism indication may also be separately configured for each DRB, that is, each DRB may correspond to one enhanced handover mechanism indication. In this case, a DRB-related operation in the following step 2 is performed on only a DRB configured with an enhanced handover mechanism indication.

Step 2: The UE applies to a target base station an RRC configuration in the handover command. At the same time, the UE maintains an RRC configuration for a source base station. The RRC configuration includes an RRC configuration in the RRC (connection) reconfiguration message as described above.

The applying to the target base station the RRC configuration in the handover command includes a combination of one or a plurality of the following operations:

Establish a MAC entity for the target base station. Preferably, a system-defined default configuration is applied to the MAC entity. Alternatively, the MAC entity is configured according to a MAC main configuration information element (mac-MainConfig) in the received RRC connection reconfiguration message.

Establish a physical layer entity for the target base station. Preferably, a system-defined default configuration is applied to the physical layer entity. Alternatively, the physical layer entity is configured according to a physical layer configuration dedicated information element (physicalConfigDeadicated) in the received RRC connection reconfiguration message.

Configure, according to a received radio resource configuration common information element (radioresourceconfigCommon), a corresponding lower layer of the target base station. Preferably, the lower layer includes a physical layer and a MAC layer.

Configure, according to a received mobility control information element (mobilityControlInfo information element), a corresponding lower layer of the target base station.

Perform, according to a received radio resource configuration dedicated information element (radioresourceconfigDedicated), a radio resource configuration procedure for the target base station.

The performing the radio resource configuration procedure includes a combination of one or a plurality of the following:

If the radio resource configuration dedicated information element includes an SRB addition/modification list, then perform on each SRB identity included in the SRB addition/modification list a combination of one or a plurality of the following:

Establish a PDCP entity according to a received PDCP configuration.
Establish an RLC entity according to a received RLC configuration.
Establish a Dedicated Control Channel (DCCH) logical channel according to a received logical channel configuration.

If the radio resource configuration dedicated information element includes a DRB addition/modification list, then perform on each DRB identity included in the DRB addition/modification list a combination of one or a plurality of the following:

Preferably, establish a PDCP entity according to a received PDCP configuration. Alternatively, reconfigure the PDCP entity according to the received PDCP configuration. The reconfiguring the PDCP entity includes establishing in the PDCP entity a corresponding functional entity such as a security function or a header compression processing function, etc., for the target base station (or described as activating/enabling a function corresponding to the target base station in the PDCP entity).

Establish an RLC entity according to a received RLC configuration.

Establish a Dedicated Control Channel (DCCH) logical channel according to a received logical channel configuration.

If the DRB identity is a part of a current UE configuration or the UE has been configured with a DRB having the same Evolved Packet Service (EPS) bearer identity, then the UE associates the established DRB (i.e., DRB-target) with a DRB (DRB-target) having the same DRB identity or a DRB (DRB-target) having the same EPS bearer identity.

Establish a packet processing entity. Preferably, a packet processing entity is established according to a received packet processing entity configuration (for example, a reordering timer configuration).

Derive key(s) for communication with the target base station, and configure a lower layer (PDCP) to apply the derived key(s) ($K_{RRCint}$, $K_{RRCenc}$, and $K_{UPenc}$) to all subsequent messages/data communicated with the target base station (received from and transmitted to the target base station).

If the received message includes a measurement configuration, then perform a measurement configuration procedure according to the received measurement configuration.

Generate an RRC connection reconfiguration complete message, and deliver the RRC connection reconfiguration complete message to the lower layer for transmission.

Step 3: The UE applies/executes (if the UE is configured with an enhanced handover mechanism in step 1) other configurations in the handover command after successfully completing a random access procedure (with the target base station) at a MAC layer. The other configurations refer to RRC configurations other than the RRC configuration in the handover command that has been applied in the foregoing step 2, for example, RRC configurations other than the radio resource configuration common information element, the radio resource configuration dedicated information element, and the mobility control information element, such as a secondary cell configuration, other configurations, an LTE-WLAN aggregation configuration, etc. The process specifically includes:

If the received RRC connection reconfiguration message includes a secondary cell addition/modification list information element, then perform addition or modification of a secondary cell of the target base station. The addition or modification of the secondary cell includes the following operations:

Perform one or both of the following operations for each secondary cell index value included in the secondary cell addition/modification list:

Add the secondary cell. Specifically, the secondary cell corresponding to the secondary cell index value is added, and the secondary cell is configured according to a received radio resource configuration for the secondary cell.

If a cell state of the secondary cell (sCellState information element) is configured and indicated as activated, then configure a corresponding lower layer (PDCP/RLC/MAC) of the target base station to set the secondary cell to an activated state; otherwise, if the cell state of the secondary cell is configured and indicated as dormant, configure the corresponding lower layer (PDCP/RLC/MAC) of the target base station to set the secondary cell to a dormant state; otherwise, configure the corresponding lower layer (PDCP/RLC/MAC) of the target base station to set the secondary cell to a deactivated state.

In the above operation, it is allowed that a secondary cell corresponding to the source base station and a secondary cell corresponding to the target base station have the same secondary cell index (or serving cell index), or have completely different secondary cell indexes (in this case, the secondary cell index of the source base station and the secondary cell index of the target base station share a secondary cell index value pool). In the former case, the UE respectively maintains separate secondary cells (lists) for the source base station and the target base station; in the latter case, the UE maintains the same secondary cell (list) for the source base station and the target base station.

If the received RRC connection reconfiguration message includes an other configuration information element (otherconfig), then perform other configuration procedures for the target base station.

Apply the remaining RRC configuration other than the RRC configuration in the received message that has been applied, such as an LWA configuration, an LWIP configuration, an RCLWI configuration, a sidelink configuration, etc.

Alternatively, for the operation of performing the radio resource configuration procedure for the target base station according to the received radio resource configuration dedicated information element (radioresourceconfigDedicated) in the foregoing step 2, the UE may also perform the operation after successfully completing the random access to the target base station in step 3.

Embodiment 3

This embodiment provides yet another method for UE to execute an RRC configuration in a handover command. Unlike the method used in Embodiment 1 in which the UE applies to the target base station all the RRC configurations in the handover command immediately after receiving the handover command, and simultaneously maintains two sets of RRC configurations for both the target base station and the source base station during the handover procedure, in Embodiment 3, after receiving a handover command, the UE immediately applies, according to a part of information elements included in the handover command, a corresponding RRC configuration to the target base station, and after successfully completing a random access procedure at a MAC layer, the UE applies, according to other part of information elements included in the handover command, a corresponding RRC configuration to the target base station.

Step 1: The UE receives a handover command (RRC (connection) reconfiguration message). The handover command instructs the UE to perform an enhanced handover mechanism, for example, the handover command includes an enhanced handover mechanism indication. Alternatively, the enhanced handover mechanism indication may also be separately configured for each DRB, that is, each DRB may correspond to one enhanced handover mechanism indication. In this case, a DRB-related operation in the following step 2 is performed on only a DRB configured with an enhanced handover mechanism indication.

Step 2: The UE applies to a target base station an RRC configuration in the handover command. At the same time, the UE maintains an RRC configuration for a source base station. The RRC configuration includes an RRC configuration in the RRC (connection) reconfiguration message as described above.

The applying to the target base station the RRC configuration in the handover command includes a combination of one or a plurality of the following operations:

Establish a MAC entity for the target base station. Preferably, a system-defined default configuration is applied to the MAC entity. Alternatively, the MAC entity is configured according to a MAC main configuration information element (mac-MainConfig) in the received RRC connection reconfiguration message.

Establish a physical layer entity for the target base station. Preferably, a system-defined default configuration is applied to the physical layer entity. Alternatively, the physical layer entity is configured according to a physical layer configuration dedicated information element (physicalConfigDeadicated) in the received RRC connection reconfiguration message.

Configure, according to a received radio resource configuration common information element (radioresourceconfigCommon), a corresponding lower layer of the target base station. Preferably, the lower layer includes a physical layer and a MAC layer.

Configure, according to a received mobility control information element (mobilityControlInfo information element), a corresponding lower layer of the target base station.

Perform, according to a received radio resource configuration dedicated information element (radioresourceconfigDedicated), a radio resource configuration procedure for the target base station.

The performing the radio resource configuration procedure includes a combination of one or a plurality of the following:

If the radio resource configuration dedicated information element includes an SRB addition/modification list, then perform on each SRB identity included in the SRB addition/modification list a combination of one or a plurality of the following:

Establish a PDCP entity according to a received PDCP configuration.

Establish an RLC entity according to a received RLC configuration.

Establish a Dedicated Control Channel (DCCH) logical channel according to a received logical channel configuration.

If the radio resource configuration dedicated information element includes a DRB addition/modification list, then perform on each DRB identity included in the DRB addition/modification list a combination of one or a plurality of the following:

Preferably, establish a PDCP entity according to a received PDCP configuration. Alternatively, reconfigure the PDCP entity according to the received PDCP configuration. The reconfiguring the PDCP entity includes establishing in the PDCP entity a corresponding functional entity such as a security function or a header compression processing function, etc., for the target base station (or described as activating/enabling a function corresponding to the target base station in the PDCP entity).

Establish an RLC entity according to a received RLC configuration.

Establish a Dedicated Control Channel (DCCH) logical channel according to a received logical channel configuration.

If the DRB identity is a part of a current UE configuration or the UE has been configured with a DRB having the same Evolved Packet Service (EPS) bearer identity, then the UE associates the established DRB (i.e., DRB-target) with a DRB (DRB-target) having the same DRB identity or a DRB (DRB-target) having the same EPS bearer identity.

Establish a packet processing entity. Preferably, a packet processing entity is established according to a received packet processing entity configuration (for example, a reordering timer configuration).

Derive key(s) for communication with the target base station, and configure a lower layer (PDCP) to apply the derived key(s) ($K_{RRCint}$, $K_{RRCenc}$, and $K_{UPenc}$) to all subsequent messages/data communicated with the target base station (received from and transmitted to the target base station).

Apply the remaining RRC configuration other than the RRC configuration that have been applied and the secondary cell addition/modification list information element and the other configuration information elements in the received message, such as a measurement configuration, an LWA configuration, an LWIP configuration, an RCLWI configuration, a sidelink configuration, etc.

Generate an RRC connection reconfiguration complete message, and deliver the RRC connection reconfiguration complete message to the lower layer for transmission.

Step 3: The UE applies/executes (if the UE is configured with an enhanced handover mechanism in step 1) a secondary cell configuration and other configuration information elements received in the handover command after successfully completing a random access procedure (with the target base station) at a MAC layer, as follows:

If the received RRC connection reconfiguration message includes a secondary cell addition/modification list information element, then perform addition or modification of a secondary cell of the target base station.

The addition or modification of the secondary cell includes the following operations:

Perform one or both of the following operations for each secondary cell index value included in the secondary cell addition/modification list:

Add the secondary cell. Specifically, the secondary cell corresponding to the secondary cell index value is added, and the secondary cell is configured according to a received radio resource configuration for the secondary cell.

If a cell state of the secondary cell (sCellState information element) is configured and indicated as activated, then configure a corresponding lower layer (PDCP/RLC/MAC) of the target base station to set the secondary cell to an activated state; otherwise, if the cell state of the secondary cell is configured and indicated as dormant, configure the corresponding lower layer (PDCP/RLC/MAC) of the target base station to set the secondary cell to a dormant state; otherwise, configure the corresponding lower layer (PDCP/RLC/MAC) of the target base station to set the secondary cell to a deactivated state.

In the above operation, it is allowed that a secondary cell corresponding to the source base station and a secondary cell corresponding to the target base station have the same secondary cell index (or serving cell index), or have completely different secondary cell indexes (in this case, the secondary cell index of the source base station and the secondary cell index of the target base station share a secondary cell index value pool). In the former case, the UE respectively maintains separate secondary cells (lists) for the source base station and the target base station; in the latter case, the UE maintains the same secondary cell (list) for the source base station and the target base station.

If the received RRC connection reconfiguration message includes an other configuration information element (otherconfig), then perform other configuration procedures for the target base station.

Alternatively, for the operation of performing the radio resource configuration procedure for the target base station according to the received radio resource configuration dedicated information element (radioresourceconfigDedicated) in the foregoing step 2, the UE may also perform the operation after successfully completing the random access to the target base station in step 3.

Embodiment 4

This embodiment provides a method for releasing a source base station in an enhanced handover mechanism.

After UE completes a handover (that is, after successfully accessing to a target base station), a connection to the source base station can be released. The operation of releasing the source base station by the UE includes one or a plurality of the following operations:

Operation 1: Reestablish an RLC entity corresponding to a DRB.

Operation 2: Release an RLC entity corresponding to a DRB.

Operation 3: For a DRB, an RRC layer transmits instruction information to a PDCP layer corresponding to the DRB, the instruction information being used to instruct the PDCP layer to generate and transmit a PDCP status report to a base station. Preferably, the base station is a target base station.

Operation 4: Reestablish a PDCP entity corresponding to a DRB.

Operation 5: Release a PDCP entity corresponding to a DRB. Optionally, part of PDCP entities corresponding to a DRB is released. For example, in the above method 2, separate functional entities (for example, a security processing function part, a header compression processing function part, etc.) corresponding to a DRB-source in the PDCP entities are released. Optionally, before releasing a PDCP entity corresponding to a DRB, the method further includes triggering generation of a PDCP status report and transmitting the PDCP status report to a base station. Preferably, the base station is the target base station.

Operation 6: Discard a security context (security key(s)) associated with the source base station. The security context (security key(s)) associated with the source base station refers to security key(s) used by the UE to communicate with the source base station, including keys $K_{eNB}$, $K_{RRCint}$, $K_{RRCenc}$, and $K_{UPenc}$. Optionally, the security context further includes security algorithm(s).

Operation 7: Discard or reset a header compression protocol context corresponding to a DRB associated with the source base station. The header compression protocol context corresponding to a DRB associated with the source base station refers to a header compression protocol context used by the UE to communicate with the source base station.

Operation 8: Stop all timers associated with the source base station, for example, a timer T310 related to source base station link quality monitoring (RLM) and/or source base station Radio Link Failure (RLF) monitoring.

Operation 9: Release all radio resources and/or radio configurations associated with the source base station. The radio resources/radio configurations associated with the source base station refer to radio resources/radio configurations used by the UE to communicate with the source base station.

Operation 10: Discard a SDAP configuration associated with a DRB. The SDAP configuration includes a mapping configuration of the DRB and a Quality of Service flow (QoS flow), namely, a Quality of Service Flow Identifier (QoS Flow Identifier, QFI) list of the mapped quality-of-service flow on the DRB.

Operation 11: Stop a reordering function of the PDCP layer. Preferably, an RRC layer of the UE instructs the PDCP layer to stop the reordering function, that is, the PDCP layer stops the reordering function after receiving an instruction of the RRC layer. Alternatively, in the aforementioned method 2, the PDCP layer stops the reordering function when a separate functional entity corresponding to a corresponding DRB-source is released.

Operation 12: Release a packet processing entity corresponding to a DRB.

The DRB refers to a DRB-source, i.e., a DRB associated with/used for communication with the source base station by the UE. Preferably, the UE performs the above DRB-related operation on a DRB having both dual protocol stacks (a protocol stack for communication with the source base station and a protocol stack for communication with the target base station). Alternatively, the UE performs the above DRB-related operation on each DRB in a DRB addition/modification list with a DRB identity thereof included in a handover command, or the UE performs the above DRB-related operation on each DRB in a DRB addition/modification list with a DRB identity thereof included in the handover command and which is configured with an enhanced handover mechanism indication (such as an enhanced MBB indication). Alternatively, the UE performs the above DRB-related operation on each DRB belonging to a current UE configuration.

The releasing the source base station by the UE may be performed based on a release command from the source base station or the target base station (for example, a source base station release instruction included in an RRC (connection) reconfiguration message), or may be performed based on a source base station release trigger condition on the UE being met (for example, a timer for source base station release on the UE expires, or downlink quality of the source base station is lower than a configured threshold, or the downlink quality of the source base station is lower than the configured threshold and the downlink quality of the target base station is higher than a configured threshold, or an RRC (connection) reconfiguration message for confirming a successful handover has been transmitted or successfully transmitted, or a random access procedure of handover to the target base station is successfully complete at a MAC layer.

Embodiment 5

This embodiment provides a UE processing method after a handover failure in an enhanced handover mechanism. After a handover fails, if a source cell has good link quality and can serve the UE, then the UE can directly fall back and recover to the source cell.

Step 1: The UE determines that a handover procedure using an enhanced handover mechanism fails. The handover failure is determined by the UE on the basis of expiry of a timer T304.

Step 2: If link quality between the UE and a source base station is normal, then the UE initiates an RRC (connection) reestablishment procedure, and transmits an RRC (connection) reestablishment request message to the source base station.

That the link quality between the UE and the source base station is normal means that a timer T310 for link quality monitoring does not expire (not running or running), or that the UE successfully receives or transmits a physical channel/signal such as a Physical Downlink Control Channel (PDCCH) or a Physical Downlink Shared Channel (PDSCH) between the UE and the source base station when step 1 occurs or within a short period of time (for example, X milliseconds, X being an integer) before the initiation in step 1.

Alternatively, the RRC connection reestablishment request message is transmitted on a pre-allocated uplink resource.

Alternatively, in the RRC connection reestablishment procedure initiating procedure, the UE performs one or a plurality of the following: 1. the UE uses a dedicated MAC configuration configured by the source cell instead of executing a default MAC configuration predefined by an application protocol; 2. the UE uses a dedicated physical layer configuration (physicalconfigDedicated information element) configured by the source cell instead of executing a default physical layer configuration predefined by the application protocol; and 3. the UE does not perform a MAC resetting operation. The UE performs these operations so that the UE has early resources to transmit the RRC connection reestablishment request message rather than acquiring resources for transmitting the RRC connection reestablishment request message through a random access procedure, thereby further reducing a service interruption delay caused by the phase of recovering the connection to the network side after a handover failure.

In this step, in the reestablished cell selection procedure when the timer T311 is running, the UE directly uses the handover source cell as a reestablished cell.

Step 3: Receive an RRC (connection) reestablishment message or an RRC (connection) establishment message transmitted by the source base station, and apply an RRC configuration in this message to recover a communication connection to the network side. Step 3 is optional.

Embodiment 6

This embodiment provides a UE processing method after a handover failure in an enhanced handover mechanism.

After a handover fails, if a source cell has good link quality and can serve the UE, then the UE can directly fall back and recover to the source cell.

Step 1: The UE determines that a handover procedure using an enhanced handover mechanism fails. The handover failure is determined by the UE on the basis of expiry of a timer T304.

Step 2: If link quality between the UE and a source base station is normal, then the UE transmits a handover failure indication to the source base station.

That the link quality between the UE and the source base station is normal means that a timer T310 for link quality monitoring does not expire (not running or running), or that the UE successfully receives or transmits a physical channel/signal such as a Physical Downlink Control Channel (PDCCH) or a Physical Downlink Shared Channel (PDSCH) between the UE and the source base station when step 1 occurs or within a short period of time (for example, X milliseconds, X being an integer) before the initiation in step 1.

Alternatively, the handover failure indication is transmitted on a pre-allocated uplink resource.

Preferably, the handover failure indication is an RRC message and is transmitted on SRB1. The handover failure indication includes one or a plurality of a cause for handover failure (e.g., T304 expiry), a target cell identity, a target cell frequency, a UE identity, a target cell or neighbor cell measurement result, etc.

Alternatively, the handover failure indication is an RRC message and is transmitted on SRB0, and includes one or a plurality of the cause for handover failure (e.g., T304 expiry), the target cell identity, the target cell frequency, the UE identity, the target cell or neighbor cell measurement result, etc. In this case the UE applies a system-predefined default MAC configuration and default physical layer configuration to transmit the handover failure indication.

Alternatively, the handover failure indication is a MAC control element or a specific MAC sub-header. A logical channel identity dedicated to the handover failure indication in the MAC sub-header is used to indicate the handover failure indication.

Step 3: Receive an RRC response message such as an RRC (connection) reconfiguration message transmitted by the source base station, and apply an RRC configuration in this message to recover a communication connection to the network side. Step 3 is optional.

Embodiment 7

This embodiment provides a UE processing method after a handover failure in an enhanced handover mechanism. After a handover fails, the UE releases a protocol stack established for a target base station and an RRC configuration applied thereto during the handover procedure, and falls back to a state before the handover, so that a radio resource (configuration) on the handover failed UE remains synchronized with that on a network side, so as to ensure subsequent recovery of a connection to the network side.

Step 1: The UE determines that a handover procedure using an enhanced handover mechanism fails. The handover failure is determined by the UE on the basis of expiry of a timer T304.

Step 2: The UE releases a DRB established for a target base station. The DRB is the aforementioned DRB-target. Preferably, the releasing the DRB established for the target base station by the UE includes releasing by the UE an RLC entity corresponding to the DRB established for the target base station. Alternatively, the method further includes releasing by the UE a PDCP entity corresponding to the DRB established for the target base station. Optionally, this step further includes releasing by the UE a MAC entity established for the target base station.

By step 2, after the handover fails, the UE releases a previous configured radio resource corresponding to the target base station, and falls back to a previous radio resource state.

Before step 1, the method further includes receiving by the UE a handover command for the enhanced handover mechanism, and performing the enhanced handover procedure. The handover command for the enhanced handover mechanism includes instruction information instructing the UE to execute the enhanced handover mechanism.

The following Embodiments 8 and 9 correspond to Embodiments 1 and 3, and provide corresponding implementation methods in an NR system.

Embodiment 8

This embodiment provides a method for UE to execute an RRC configuration in a handover command in an enhanced handover mechanism.

Step 1: The UE receives a handover command (an RRC reconfiguration message including a reconfigurationWithSync information element). The handover command instructs the UE to perform an enhanced handover mechanism, for example, the handover command includes an enhanced handover mechanism indication. Alternatively, the enhanced handover mechanism indication may also be separately configured for each DRB, that is, each DRB may correspond to one enhanced handover mechanism indication. In this case, a DRB-related operation in the following step 2 is performed on only a DRB configured with an enhanced handover mechanism indication.

Step 2: The UE applies to a target base station an RRC configuration in the handover command, and the UE maintains an RRC configuration for a source base station at the same time. By this step, the UE applies two sets of configurations to all RRC configurations, one set corresponding to the source base station for communication between the UE and the source base station; and one set corresponding to the target base station for communication between the UE and the target base station. The RRC configurations include an RRC configuration in the RRC (connection) reconfiguration message as described above.

The applying to the target base station the RRC configuration in the handover command includes a combination of one or a plurality of the following operations:

Establish a MAC entity for the target base station. Preferably, a system-defined default configuration is applied to the MAC entity. Alternatively, the MAC entity is configured according to a MAC cell group configuration information element (mac-cellGroupConfig included in a cellgroupconfig information element) in the received RRC reconfiguration message.

Establish a physical layer entity for the target base station. Preferably, a system-defined default configuration is applied to the physical layer entity. Alternatively, the physical layer entity is configured according to a physical layer cell group configuration information element (physicalcellGroupConfig included in the cellgroupconfig information element) in the received RRC reconfiguration message.

Perform a synchronization reconfiguration procedure (reconfiguration with sync procedure, see Section 5.3.5.5.2 of 3GPP Protocol Specification Document 38.331) according to a reconfigurationWithSync information element included in the cell group configuration information element.

Perform a radio resource configuration procedure for the target base station according to a received radio bearer configuration information element (radiobearerconfig). Alternatively, the UE may also perform this operation after a random access to the target base station is successfully complete.

The performing the radio resource configuration procedure includes a combination of one or a plurality of the following:

If the radio bearer configuration information element includes an SRB addition/modification list, then perform on each SRB identity included in the SRB addition/modification list a combination of one or a plurality of the following:

Establish a PDCP entity according to a received PDCP configuration.

If the radio bearer configuration information element includes a DRB addition/modification list, then perform on each DRB identity included in the DRB addition/modification list a combination of one or a plurality of the following:

Preferably, establish a PDCP entity according to a received PDCP configuration. Alternatively, reconfigure the PDCP entity according to the received PDCP configuration. The reconfiguring the PDCP entity includes establishing in the PDCP entity a corresponding functional entity such as a security function or a header compression processing function, etc., for the target base station (or described as activating/enabling a function corresponding to the target base station in the PDCP entity).

If the DRB identity is a part of a current UE configuration or the UE has been configured with a DRB having the same DRB identity, then the UE associates the established DRB (i.e., DRB-target) with a DRB (DRB-target) having the same DRB identity.

Establish a packet processing entity. Preferably, a packet processing entity is established according to a received packet processing entity configuration (for example, a reordering timer configuration).

If the received cell group configuration information element (cellgroupconfig) includes an RLC bearer addition/modification list information element (rlc-BearerToAddModList), then perform an RLC bearer addition/modification procedure for the target base station according to the RLC bearer addition/modification list information element. Alternatively, the UE may also perform this operation after a random access to the target base station is successfully complete.

The RLC bearer addition/modification procedure for the target base station includes a combination of one or a plurality of the following:

Perform, on each logical channel identity included in the RLC bearer addition/modification list information element, a combination of one or a plurality of the following:

Establish an RLC entity according to a received RLC configuration, and if no RLC configuration is received, then establish an RLC entity by using a protocol-specified default configuration.

Configure a logical channel in a corresponding MAC entity according to a received logical channel configuration; if no logical channel configuration is received, then configure a logical channel in the corresponding MAC entity according to a protocol-defined default logical channel configuration, and associate the logical channel with a PDCP entity having the same radio bearer identity (identified by a servedRadioBearer information element).

Derive key(s) for communication with the target base station, and configure a lower layer (PDCP) to apply the derived key(s) ($K_{RRCint}$, $K_{RRCenc}$, and $K_{UPenc}$) to all subsequent messages/data communicated with the target base station (received from and transmitted to the target base station).

If the cell group configuration information element (cellGroupConfig) in the received RRC reconfiguration message includes a secondary cell addition/modification list information element, then perform addition or modification of a secondary cell of the target base station.

The addition or modification of the secondary cell includes the following operations:

Perform one or both of the following operations for each secondary cell index value included in the secondary cell addition/modification list:

Add the secondary cell. Specifically, the secondary cell corresponding to the secondary cell index value is added, and the secondary cell is configured according to a received radio resource configuration for the secondary cell.

Set the secondary cell to a deactivated state.

In the above operation, it is allowed that a secondary cell corresponding to the source base station and a secondary cell corresponding to the target base station have the same secondary cell index (or serving cell index), or have completely different secondary cell indexes (in this case, the secondary cell index of the source base station and the secondary cell index of the target base station share a secondary cell index value pool). In the former case, the UE respectively maintains separate secondary cells (lists) for the source base station and the target base station; in the latter case, the UE maintains the same secondary cell (list) for the source base station and the target base station.

If the received RRC connection reconfiguration message includes an other configuration information element (otherconfig), then perform other configuration procedures for the target base station.

If the received RRC reconfiguration message includes a measurement configuration information element, perform a measurement configuration procedure according to the received measurement configuration.

If the received RRC reconfiguration message includes a dedicatedSIB1-Delivery information element, then perform an operation to be performed upon reception of a first system information block (SIB1). The dedicatedSIB1-Delivery information element is used to convey SIB1 of the target cell to the UE.

If the received RRC reconfiguration message includes a dedicatedSystemInformationDelivery information element, then perform an operation to be performed upon reception of system information. The dedicatedSystemInformationDelivery information element is used to convey SIB6, SIB7, and SIB8 of the target cell to the UE.

Generate an RRC reconfiguration complete message, and deliver the RRC reconfiguration complete message to the lower layer for transmission.

Embodiment 9

This embodiment provides a method for UE to execute an RRC configuration in a handover command in an enhanced handover mechanism. Unlike the method used in Embodiment 8 in which the UE applies to the target base station all the RRC configurations in the handover command immediately after receiving the handover command, and simultaneously maintains two sets of RRC configurations for both the target base station and the source base station during the handover procedure, in Embodiment 9, after receiving a handover command, the UE immediately applies, according to a part of information elements included in the handover command, a corresponding RRC configuration to the target base station, and after successfully completing a random access procedure at a MAC layer, the UE applies, according to other part of information elements included in the handover command, a corresponding RRC configuration to the target base station.

Step 1: The UE receives a handover command (an RRC reconfiguration message including a reconfigurationWithSync information element). The handover command instructs the UE to perform an enhanced handover mechanism, for example, the handover command includes an enhanced handover mechanism indication. Alternatively, the enhanced handover mechanism indication may also be separately configured for each DRB, that is, each DRB may correspond to one enhanced handover mechanism indication. In this case, a DRB-related operation in the following step 2 is performed on only a DRB configured with an enhanced handover mechanism indication.

Step 2: The UE applies to a target base station an RRC configuration in the handover command, and the UE maintains an RRC configuration for a source base station at the same time. The RRC configurations include an RRC configuration in the RRC (connection) reconfiguration message as described above.

The applying to the target base station the RRC configuration in the handover command includes a combination of one or a plurality of the following operations:

Establish a MAC entity for the target base station. Preferably, a system-defined default configuration is applied to the MAC entity. Alternatively, the MAC entity is configured according to a MAC cell group configuration information element (mac-cellGroupConfig included in a cellgroupconfig information element) in the received RRC reconfiguration message.

Establish a physical layer entity for the target base station. Preferably, a system-defined default configuration is applied to the physical layer entity. Alternatively, the physical layer entity is configured according to a physical layer cell group configuration information element (physicalcellGroupConfig included in the cellgroupconfig information element) in the received RRC reconfiguration message.

Perform a synchronization reconfiguration procedure (reconfiguration with sync procedure, see Section 5.3.5.5.2 of 3GPP Protocol Specification Document 38.331) according to a reconfigurationWithSync information element included in the cell group configuration information element.

Perform a radio resource configuration procedure for the target base station according to a received radio bearer configuration information element (radiobearerconfig). Alternatively, the UE may also perform this operation after a random access to the target base station is successfully complete.

The performing the radio resource configuration procedure includes a combination of one or a plurality of the following:

If the radio bearer configuration information element includes an SRB addition/modification list, then perform on each SRB identity included in the SRB addition/modification list a combination of one or a plurality of the following:

Establish a PDCP entity according to a received PDCP configuration.

If the radio bearer configuration information element includes a DRB addition/modification list, then perform on each DRB identity included in the DRB addition/modification list a combination of one or a plurality of the following:

Preferably, establish a PDCP entity according to a received PDCP configuration. Alternatively, reconfigure the PDCP entity according to the received PDCP configuration. The reconfiguring the PDCP entity includes establishing in the PDCP entity a corresponding functional entity such as a security function or a header compression processing function, etc., for the target base station (or described as activating/enabling a function corresponding to the target base station in the PDCP entity).

If the DRB identity is a part of a current UE configuration or the UE has been configured with a DRB having the same DRB identity, then the UE associates the established DRB (i.e., DRB-target) with a DRB (DRB-target) having the same DRB identity.

Establish a packet processing entity. Preferably, a packet processing entity is established according to a received packet processing entity configuration (for example, a reordering timer configuration).

If the received cell group configuration information element (cellgroupconfig) includes an RLC bearer addition/modification list information element (rlc-BearerToAddModList), then perform an RLC bearer addition/modification procedure for the target base station according to the RLC bearer addition/modification list information element. Alternatively, the UE may also perform this operation after a random access to the target base station is successfully complete.

The RLC bearer addition/modification procedure for the target base station includes a combination of one or a plurality of the following:

Perform, on each logical channel identity included in the RLC bearer addition/modification list information element, a combination of one or a plurality of the following:

Establish an RLC entity according to a received RLC configuration, and if no RLC configuration is received, then establish an RLC entity by using a protocol-specified default configuration.

Configure a logical channel in a corresponding MAC entity according to a received logical channel configuration; if no logical channel configuration is received, then configure a logical channel in the corresponding MAC entity according to a protocol-defined default logical channel configuration, and associate the logical channel with a PDCP entity having the same radio bearer identity (identified by a servedRadioBearer information element).

Derive key(s) for communication with the target base station, and configure a lower layer (PDCP) to apply the derived key(s) ($K_{RRCint}$, $K_{RRCenc}$, and $K_{UPenc}$) to all subsequent messages/data communicated with the target base station (received from and transmitted to the target base station).

If the received RRC reconfiguration message includes a measurement configuration information element, perform a measurement configuration procedure according to the received measurement configuration.

If the received RRC reconfiguration message includes a dedicatedSIB1-Delivery information element, then perform an operation to be performed upon reception of a first system information block (SIB1). The dedicatedSIB1-Delivery information element is used to convey SIB1 of the target cell to the UE.

If the received RRC reconfiguration message includes a dedicatedSystemInformationDelivery information element, then perform an operation to be performed upon reception of system information. The dedicatedSystemInformationDelivery information element is used to convey SIB6, SIB7, and SIB8 of the target cell to the UE.

Generate an RRC reconfiguration complete message, and deliver the RRC reconfiguration complete message to the lower layer for transmission.

Step 3: The UE applies/executes (if the UE is configured with an enhanced handover mechanism in step 1) a secondary cell configuration and other configurations in the handover command after successfully completing the random access procedure (with the target base station) at a MAC layer. The process specifically includes:

If the cell group configuration information element (cellGroupConfig) in the received RRC reconfiguration message includes a secondary cell addition/modification list information element, then perform addition or modification of a secondary cell of the target base station.

The addition or modification of the secondary cell includes the following operations:

Perform one or both of the following operations for each secondary cell index value included in the secondary cell addition/modification list:

Add the secondary cell. Specifically, the secondary cell corresponding to the secondary cell index value is added, and the secondary cell is configured according to a received radio resource configuration for the secondary cell.

Set the secondary cell to a deactivated state.

In the above operation, it is allowed that a secondary cell corresponding to the source base station and a secondary cell corresponding to the target base station have the same secondary cell index (or serving cell index), or have completely different secondary cell indexes (in this case, the secondary cell index of the source base station and the secondary cell index of the target base station share a secondary cell index value pool). In the former case, the UE respectively maintains separate secondary cells (lists) for the source base station and the target base station; in the latter case, the UE maintains the same secondary cell (list) for the source base station and the target base station.

If the received RRC connection reconfiguration message includes an other configuration information element (otherconfig), then perform other configuration procedures for the target base station.

Alternatively, for the operations of performing the radio bearer configuration procedure and RLC bearer configuration for the target base station according to the received radio bearer configuration information element and the RLC bearer addition/discarding information element in the foregoing step 2, the UE may also perform the operations after successfully completing the random access to the target base station in step 3.

Figure 4:
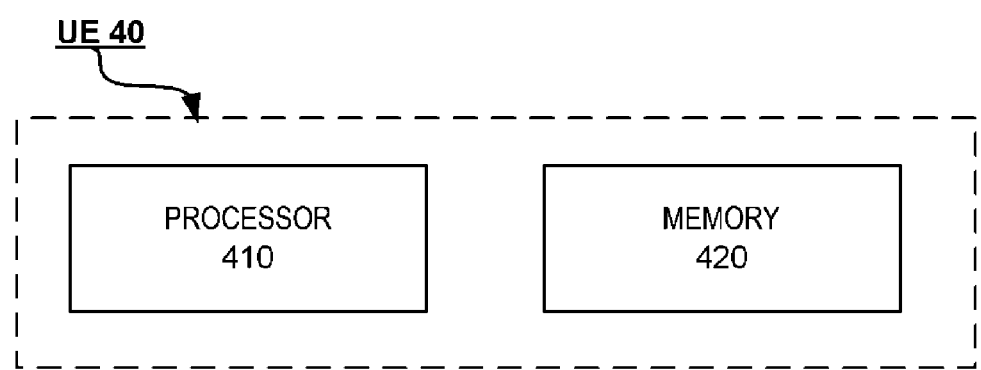
FIG. 4 is a block diagram showing user equipment according to an embodiment of the present disclosure.

FIG. 4 is a block diagram showing user equipment 40 according to an embodiment of the present disclosure. As shown in FIG. 4, the user equipment 40 includes a processor 410 and a memory 420. The processor 410 may, for example, include a microprocessor, a microcontroller, an embedded processor, or the like. The memory 420 may, for example, include a volatile memory (for example, a Random Access Memory (RAM)), a Hard Disk Drive (HDD), a non-volatile memory (for example, a flash memory), or other memories. Program instructions are stored on the memory 420. The instructions, when run by the processor 410, can perform the aforementioned handover method in user equipment described in detail in the present disclosure.

The methods and related devices according to the present disclosure have been described above in conjunction with preferred embodiments. It should be understood by a person skilled in the art that the methods illustrated above are only exemplary. The method according to the present disclosure is not limited to steps or sequences shown above. The base station and user equipment shown above may include more modules. For example, the base station and user equipment may further include modules that may be developed or will be developed in the future to be applied to a base station, an MME, or UE. Various identifiers shown above are only exemplary, not for limitation, and the present disclosure is not limited to specific information elements serving as examples of these identifiers. A person skilled in the art can make various alterations and modifications according to the teachings of the illustrated embodiments.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions can be achieved by the computer system through reading programs recorded on the recording medium and executing them. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other computer-readable recording medium.

Various features or functional modules of the device used in the above embodiments may be implemented or executed through circuits (for example, monolithic or multi-chip integrated circuits). Circuits designed to execute the functions described in this description may include general-purpose processors, Digital Signal Processors (DSPs), application-specific integrated circuits (ASICs), Field Programmable Gate Arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above-mentioned embodiments. The present disclosure also includes any design modifications that do not depart from the main idea of the present disclosure. In addition, various modifications can be made to the present disclosure within the scope of the claims. Embodiments resulting from the appropriate combinations of the technical means disclosed in different embodiments are also included within the technical scope of the present disclosure. In addition, components with the same effect described in the embodiments above may be replaced with one another.

The invention claimed is:

1. A User Equipment (UE), comprising:
receiving circuitry configured to receive a first Radio Resource Control (RRC) message for an RRC configuration from a source base station, and to receive a second RRC message including a release command from a target base station; and
handover circuitry configured to apply the RRC configuration based on the first RRC message in which separate indications are configured for Data Radio Bearers (DRBs), and to perform a source base station release based on the release command, wherein
the RRC configuration is applied before a successful completion of a random access procedure,
the application of the RRC configuration includes:
establishing a Medium Access Control (MAC) entity for the target base station,
for each of the DRBs configured with the separate indications, on a basis of a radio resource configuration dedicated information element carried in the first RRC message, establishing a Radio Link Control (RLC) entity for the target base station and reconfiguring a Packet Data Convergence Protocol (PDCP) entity to establish a security function, and
for a Signaling Radio Bearer (SRB), on the basis of the radio resource configuration dedicated information element carried in the first RRC message, establishing a PDCP entity for the target base station and establishing an RLC entity for the target base station,
the separate indications indicate that the UE maintains a source base station communication and a target base station communication during a handover for the DRBs,
the source base station release includes, for each of the DRBs, releasing an RLC entity for the source base station, and releasing a security function for the source base station, and
for each of the DRBs, the release command causes a PDCP layer to send a PDCP status report to the target base station.

2. The UE of claim 1, wherein
the source base station release further includes:
for each of the DRBs, re-establishing the RLC entity for the source base station.

3. The UE of claim 1, wherein
the source base station release further includes:
discarding security keys used in the source base station.

4. The UE of claim 1, wherein
the handover circuitry is further configured to, upon timer T304 expiry associated with a master cell group for a handover failure;
release the MAC entity for the target base station, and
for each of the DRBs, release the security function and the RLC entity for the target base station.

5. The UE of claim 1, wherein
the handover circuitry is further configured to, upon timer T304 expiry associated with a master cell group for a handover failure, transmit a third RRC message including a handover failure indication via an SRB1 to the source base station if a timer T310 for the source base station is not expired.

6. A handover method performed by a User Equipment (UE), the handover method comprising:
receiving a first Radio Resource Control (RRC) message for an RRC configuration from a source base station;
receiving a second RRC message including a release command from a target base station;
performing a source base station release based on the release command; and
applying the RRC configuration based on the first RRC message in which separate indications are configured for Data Radio Bearers (DRBs),
wherein
the RRC configuration is applied before a successful completion of a random access procedure,
applying the RRC configuration includes:
establishing a Medium Access Control (MAC) entity for the target base station,
for each of the DRBs configured with the separate indications, on a basis of a radio resource configuration dedicated information element carried in the first RRC message, establishing a Radio Link Control (RLC) entity for the target base station and reconfiguring a Packet Data Convergence Protocol (PDCP) entity to establish a security function, and
for a Signaling Radio Bearer (SRB), on the basis of the radio resource configuration dedicated information element carried in the first RRC message, establishing a PDCP entity for the target base station and establishing an RLC entity for the target base station,
wherein the separate indications indicate that the UE maintains a source base station communication and a target base station communication during a handover for the DRBs,
the source base station release includes, for each of the DRBs, releasing an RLC entity for the source base station, and releasing a security function for the source base station, and
for each of the DRBs, the release command causes a PDCP layer to send a PDCP status report to the target base station.

7. The handover method of claim 6, wherein the source base station release further includes:
for each of the DRBs, re-establishing the RLC entity for the source base station.

8. The handover method of claim 6, wherein the source base station release further includes:
discarding security keys used in the source base station.

9. The handover method of claim 6, further comprising:
upon timer T304 expiry associated with a master cell group for a handover failure;
releasing the MAC entity for the target base station, and
for each of the DRBs, releasing the security function and the RLC entity for the target base station.

10. The handover method of claim 6, further comprising:
upon timer T304 expiry associated with a master cell group for a handover failure, transmitting a third RRC message including a handover failure indication via an SRB1 to the source base station if a timer T310 for the source base station is not expired.

* * * * *